UNITED STATES PATENT OFFICE.

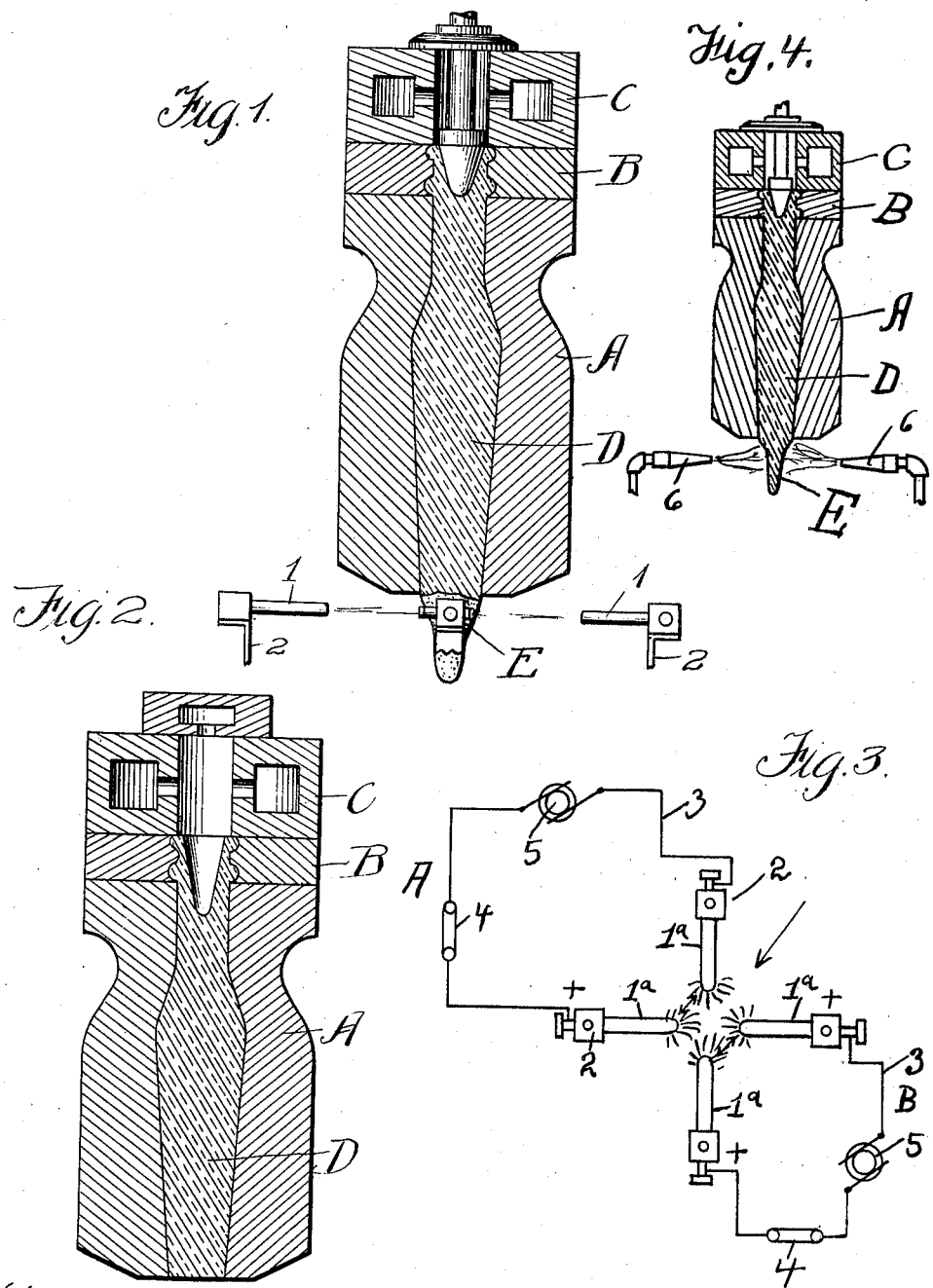

JOHN I. ARBOGAST, OF PITTSBURG, PENNSYLVANIA, ASSIGNOR OF ONE-HALF TO HENRY L. COLLINS, OF PITTSBURG, PENNSYLVANIA.

METHOD OF SEVERING GLASS.

1,002,954.            Specification of Letters Patent.     Patented Sept. 12, 1911.

Application filed January 3, 1910. Serial No. 535,996.

*To all whom it may concern:*

Be it known that I, JOHN I. ARBOGAST, a citizen of the United States of America, residing at S. S. Pittsburg, in the county of Allegheny and State of Pennsylvania, have invented certain new and useful Improvements in Methods of Severing Glass, of which the following is a specification, reference being had therein to the accompanying drawing.

This invention relates to a method of severing glass, and more particularly to a device adapted to be used in connection with glass gathering tools or devices commonly used in glass works for gathering or picking up quantities of molten glass prior to depositing the same in molds employed for shaping the molten glass into glass articles.

My invention aims to provide positive and reliable means for removing the thread or string that follows a gathering tool or device when a gathering of molten glass is obtained from a tank or pot.

It has been the present practice to use single or double metallic shears for cutting off the thread or string of a gathered batch of molten glass, and on account of the inequality between molten glass and the cold metal, the metallic shears leave what is commonly termed a "sandy formation". The formation is caused by the metallic shears cooling to a detrimental degree the lower end of the gathered glass, which changes the consistency of the gathered glass at the lower end thereof to that extent that after molding and blowing, it is impossible to eliminate the defect produced by the inequality between the cold metal and molten glass. This is particularly true in connection with hollow glass articles produced by automatic machines that automatically gather, mold and blow articles. An examination of any article produced by such a machine shows a button, scar or blemish upon the bottom of the article, which is the most noticeable imperfection in connection with articles made by automatic machines. These buttons, as they will be hereinafter termed, are due solely to the shears or cutting-off device at present used, and it is the principal object of my invention to eliminate the buttons and provide a glass article with a bottom that will be as perfect in formation as any other part of the article. To this end, I utilize a simple and effective method that will positively sever the thread or string of a gathered batch of glass without changing the consistency or temperature of the lower end of the gathered batch.

The invention will be hereinafter considered in detail and then claimed, reference being had to the accompanying drawings wherein is illustrated means capable of carrying a method in accordance with this invention into effect.

In the drawings:—Figure 1 is a vertical sectional view of a blank mold connected with a vacuum-producing means, showing the thread or string and a means capable of carrying into effect the method for removing the thread or string, Fig. 2 is a view showing the thread or string removed, Fig. 3 is a plan of an electrical arrangement capable of carrying the method into effect, and Fig. 4 is a vertical sectional view of the blank mold connected with the vacuum producing element, showing another means capable of carrying the method into effect.

In the drawings I have illustrated the molds and the suction and blowing head substantially of the type shown in the Owens Patent No. 766,768 of August 2nd, 1904, which machine is one of the machines by which my method may be carried out, without materially changing the machine.

The reference character A represents the blank mold of the Owens machine, B the neck mold and C the suction and blowing head with which these molds are connected.

D indicates a batch of molten glass that has been gathered or sucked-up into the molds A and B, and E represents the thread or string or that portion of the blank that projects downwardly from the mold A.

To remove the thread or projection E without chilling or changing the consistency of the lower end of the batch contained in the mold A, the thread or string is subjected to the quick application of a heating agent of high temperature whereby the thread or string is severed from the batch without changing the consistency or temperature of the lower end thereof. As shown in Fig. 3 an electrical means capable of carrying the method into effect is illustrated and said electrical means provides for the obtaining of a disruptive discharge constituting a heating medium of high temperature which will sever the thread or string E and completely remove the same and leave the lower end of the blank or gathered batch of glass smooth and absolutely and positively perfect. The electrical means for accomplishing this result comprises two electrical circuits A, B, each of which embodying 1, 1ᵃ, respectively a plurality of electrodes which are suitably supported, for instance by brackets 2, at a point whereby the gathering mold can raise and lower between the two sets of electrodes. It is preferable to arrange the electrodes adjacent to the tank or pot containing the molten glass, whereby the thread or string will be immediately severed after the desired quantity of glass has been gathered. The electrodes are connected by wires 3 to a suitable switch 4 in circuit with a generator 5. The disruptive electrical discharge formed by arranging the electrodes in the manner as stated will provide a heating agent of high temperature which on its quick application to the thread or string will sever it from the batch of glass and leave the bottom of the batch within the mold A as smooth and as clean-cut as shown in Fig. 2 of the drawings. The thread or string during the severing operation passes between the two sets of electrodes and the electrodes are arranged close enough together whereby the two jump sparks will produce practically a single flame.

It is also possible, as disclosed in Fig. 4, to utilize gas, either natural or artificial under pressure for accomplishing the same result as by electricity. When gas is used two or more burners 6 can be arranged so that a quick application of the flames which are of high temperature can be had against the thread or string, whereby the heat of the flame will quickly sever the thread or string and leave the bottom of the batch as smooth and even as shown in Fig. 2.

The application of the heating agent of high temperature is had against the thread close up to the bottom of the holder whereby when the thread is severed, the lower end of the batch will be flush with the bottom of the holder, the severing of the thread being accomplished without changing the consistency or temperature of the lower end of the batch.

From the foregoing it will be observed that I have devised novel means for cutting off the lower end of a blank without chilling the blank as is done by a knife blade or shears. Since my means can be easily installed and readily maintained in an operable condition without the use of skilled labor, the disfigured bottom can be eliminated, thereby obtaining a better quality of hand or machine article.

Having now described my invention, what I claim as new, is:—

1. A method of removing the thread or string projecting from a gathered batch of glass contained in a holder consisting in the quick application of a heating agent of high temperature against the thread or string close up to the bottom of the holder whereby the thread is severed from the batch to cause the lower end of the batch to be flush with the bottom of the holder without changing the consistency or temperature of the lower end of the batch.

2. A method of removing the thread or string projecting from a gathered batch of glass contained in a holder consisting in quickly passing the thread close up to the bottom of the holder through a heating agent of a high temperature whereby the thread is severed from the batch to cause the lower end of the batch to be flush with the bottom of the holder without changing the consistency or temperature of the lower end of the batch.

In testimony whereof I affix my signature in the presence of two witnesses.

JOHN I. ARBOGAST.

Witnesses:
 Max H. Srolovitz,
 Karl H. Butler.